April 4, 1944.                H. M. DODGE                2,345,588
                                 OIL SEAL
                             Filed Nov. 1, 1941

INVENTOR
Howard M. Dodge
BY Evans + McCoy
ATTORNEYS

Patented Apr. 4, 1944

2,345,588

UNITED STATES PATENT OFFICE 2,345,588

OIL SEAL

Howard M. Dodge, Wabash, Ind., assignor to The General Tire & Rubber Company, Akron, Ohio, a corporation of Ohio Application November 1, 1941, Serial No. 417,517

5 Claims. (Cl. 288—3)

This invention relates to improvements in machinery packing, and particularly to external oil or grease seals of the self-contained type.

The grease seals heretofore proposed have usually contained one or more metallic spring members which press against sealing members of leather, rubber, or the like. While such oil seals when properly assembled have usually been effective, it has often been difficult to properly center the component parts of the seal so that uniform pressure was obtained over the entire sealing edges.

Oil and grease seals which do not contain metallic springs have many inherent advantages over seals in which the metallic springs press against the sealing member. Oil seals heretofore proposed, using a relatively resilient rubber as a spring to press against the sealing member, have not, however, been entirely satisfactory. In one type where a relatively heavy ring of a resilient rubber is prevented from increasing in circumference by a close fitting casing, it is exceedingly difficult to obtain the desired concentration of pressure at the sealing edge or lip of the seal. This is apparently because a block of rubber has substantially greater compressive strength at its mid-portion than adjacent its edges. Another type, wherein the pressure is applied by a small band of rubber floating on the edge of the lip of the seal, is often not desirable because there is a substantial tendency for the diameter of the small band to increase in size due to the swelling of the rubber in use, and with the stiff stocks the sealing pressure may be insufficient. Such seals are not operable as external seals having the sealing edge at their outer periphery.

It is an object of the present invention to provide an external type oil seal utilizing a relatively resilient rubber-like material as a pressure member, and having the pressure strongly concentrated adjacent the sealing tip.

It is another object of the present invention to provide an external type oil seal that is relatively easy to assemble with its component parts in correct alignment.

It is a further object of the present invention to provide an external type oil seal wherein the pressure is concentrated adjacent the tip of the sealing member, and in which the swelling of the rubber will account for effects due to wearing of the sealing member by the shaft.

It is a still further object to provide external type oil seals having extremely long wearing properties and which are relatively easy to manufacture and of comparatively low cost.

Other objects will be apparent from the following detailed description of the invention as illustrated by the accompanying drawing, in which.

Figure 1:
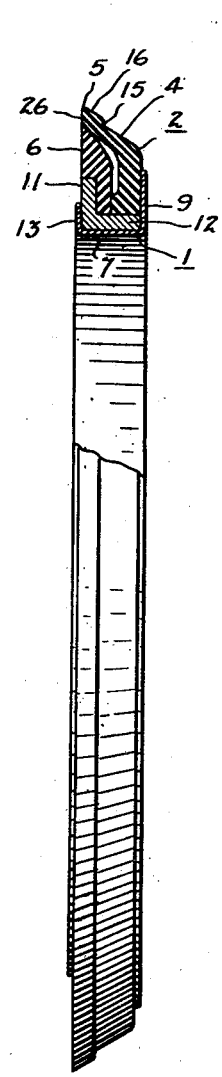
Figure 1 is an elevational view, partly in section, of an external oil seal involving the present invention.
Figure 2:
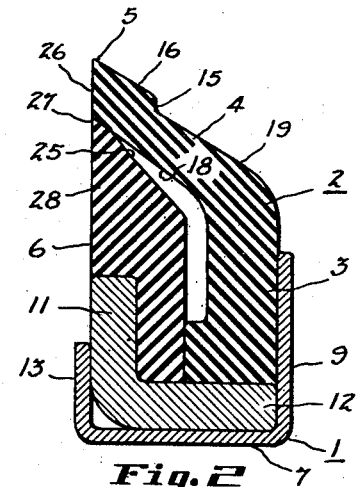
Fig. 2 is an enlarged sectional view taken through a portion of the oil seal of Fig. 1.
Figure 3:
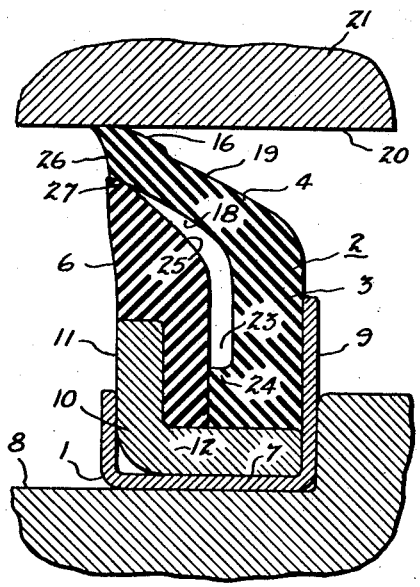
Fig. 3 is a sectional view through a portion of an assembly showing the seal fixedly mounted on the shaft with the sealing edge in contact with the portion of the housing.

In my prior application, Serial No. 389,391, filed April 19, 1941, now Patent No. 2,316,941 issued April 20, 1943, of which the present application is a continuation in part, I disclosed an internal oil and grease seal wherein these disadvantages of the seals heretofore produced were completely overcome. The seals therein described are adapted to be fixedly held by the housing. It has now been found an extremely effective external seal having all of the resilient members properly shaped and formed of molded rubber-like material may also be produced.

Referring particularly to the drawing in which like parts are designated by the same numerals of reference throughout the several views, the seals of the present invention have a metal casing member 1 which is adapted to be rigidly held on the shaft and to rotate therewith. An angle-shaped molded packing ring 2 having an annular radially extending portion 3 and an annular sealing portion 4 which terminates in a sealing lip 5 is carried by the casing 1. The sealing portion 4 of the molded packing ring 2 extends at an angle to the radial portion 3, and an annular molded pressure member 6 is carried by said casing within the re-entrant angle between the radial portion 3 and the sealing portion 4.

The casing 1 is generally U shaped; it has a cylindrical portion 7, which has an internal inner diameter such that it may be fixedly held in oil tight relation upon the shaft 8, an annular outwardly extending substantially radial backing portion 9 preferably attached to the cylindrical portion or member 10 which has an outwardly extending substantially radial annular portion 11, and preferably a cylindrical portion 12. Means, such as a deformed edge portion 13 may be provided for maintaining the cylindrical and backing portions 7 and 9, respectively, in fixed rigid relation with the restraining member 10.

The packing ring 2 is molded from a rubber-like material or synthetic rubber compound containing finely divided carbon and preferably some graphite and having a high degree of oil resistance and abrasion resistance. It preferably has a hardness of at least sixty on the durometer type A scale; a hardness or stiffness of between 65 and 80 is found to be preferable.

The sealing portion 4 of the molded packing ring 2 is preferably generally of frusto-conical shape, and inclined from the radial portion 3 toward the inner cylindrical surface 20 of the housing 21. It is preferably provided adjacent its free edge or sealing lip 5 with an annular shoulder 15 to form a relatively short sealing or wearing surface 16, which is preferably so designed in relation to the inner diameter of the housing 21 that it will be frusto-conical in its molded state and yet be substantially cylindrical, at least adjacent the sealing tip 5, when it is deformed by contact with the inner cylindrical surface of the housing. Preferably, the radial portion 3 of the molded packing ring has portions removed so that an annular groove 23 is formed adjacent the juncture of the inner conical surface 18 and the radial flange 3.

The groove 23 is important in increasing the flexibility of the sealing portion 4, in spacing the outer tapered surface of the pressure ring from all but the area adjacent the free end of said packing ring, and in providing a shoulder 24 adjacent the periphery of the central aperture in the packing ring 2 so that sealing pressure between the radial portion of said pressure ring and said packing ring may be concentrated.

The pressure ring 6 is preferably of softer oil resistant synthetic rubber than that of the packing ring 2. For best results it should have a hardness of less than about 50 durometer A scale. The pressure ring 6 is carried by the restraining member of said casing within the annular space formed by the re-entrant angle between the sealing portion 4 and the radially extending portion 3 of the molded packing ring. It has an outer tapered surface 25 which may also be frusto-conical in shape and which may be complemental to the inner surface 18 of the molded packing ring 2.

The surface 25 is adapted to bear against the surface 18 of the packing ring only over the sealing lip 5 and adjacent the free end 26 of the sealing portion.

According to the present invention the molded pressure ring is held or restrained by the radial portion 11 of the restraining member 10 and preferably by rubber-to-metal adhesion thereto, so that outward movement of its peripheral or contact end 27 beyond the free end 26 of the packing ring 2 will cause tension in the area adjacent the inner surface 25 so as to provide sort of cantilever action which increases the concentration of pressure over the sealing lip 5 when the latter is deformed by contact with the inner cylindrical surface 20 of the housing 21.

Although a slight outward-inward movement of the pressure ring 6 is permitted when the seal is deformed by the inner cylindrical surface 20, the means provided for restraining outward movement limits the amount of movement. Means is thus provided for increasing the sealing pressure adjacent the free edge of the peripheral lip 5. The cylindrical portion 12 of the restraining member has been found to be desirable in reinforcing the radial portion so as to prevent its deformation by the tension exerted by the pressure ring when the latter is deformed outwardly in cantilever-like manner.

The packing ring 2 is molded so that the diameter of its outer periphery at the lip 5 is somewhat larger than the inner diameter 20 of the housing 21. The pressure ring 6 is preferably molded of sufficient diameter for its tapered end 27 to be in contact with the inner conical surface 18 of the packing ring when the latter is in the undeformed state. When the seal is applied to a shaft the packing 2 is deformed so that the sealing lip 5 bears against the inner surface 20 of the housing along the entire periphery thereof. Such deformation causes compression of the outer edge portion 28 of the pressure ring 6 between the sealing portion 4 of the packing ring 2 and the radially extending portion 11 of the restraining ring 10. The deformation of the sealing portion 4 by the housing 20 also causes the peripheral portion 27 of the pressure ring 6 to move outwardly, resulting in tension in the inner surface portion 25 so that a heel and toe or cantilever-like action is thereby obtained to increase the pressure on the surface 18 over the sealing lip adjacent free end 26.

It has also been found with the pressure member bonded to the casing as above described, the pressure on the sealing surface will be increased rather than decreased by the slight swelling which usually occurs within the pressure member due to petroleum products or other fluids being absorbed therein. Since the area in contact with the solvent is relatively small, such swelling takes place very gradually and under usual conditions it is just about sufficient to compensate for the wear at the sealing surface.

Any of the oil-resistant synthetic rubbers, such as, for example, polychloroprene, and the co-polymers of butadiene with acrylic nitrile, styrene, vinyl chloride and certain other resin-forming materials, may be suitably compounded and used for forming the molded elements of the present invention. It is intended that the term "rubberlike" material includes such synthetic rubbers, as well as natural rubber.

It is also apparent that numerous modifications of the invention may be made without changing the spirit thereof, and it is intended that it be limited only by the appended claims.

What I claim is:

1. An oil retaining device to seal a space between a housing and a rotatable shaft comprising an outwardly opening generally U shaped metal casing having a cylindrical portion to be fixedly held in oil tight contact on said shaft, a substantially radial backing portion carried by said cylindrical portion, and an outwardly extending annular restraining portion spaced from said backing portion; an angle shaped molded packing ring of oil resistant rubberlike material, said packing ring having a substantially radial annular portion disposed within said casing and bearing against the backing portion of said casing, and a sealing portion carried by said radial annular portion and in angular relation and integral herewith, said sealing portion having a generally conoidal inner surface and terminating at its free end in an annular sealing lip which is adapted to bear against an inner cylindrical surface; a molded pressure ring of flexible oil resistant soft resilient synthetic rubber compound disposed within the re-entrant angle between said radial portion and said sealing portion of said packing ring, said pressure ring having a portion which bears against said outwardly extending annular restraining portion of said casing and an outer tapered surface with an outer peripheral end portion that bears against the inner surface of said sealing portion of said packing ring adjacent the free end thereof; the pressure ring being molded on and adhesively attached to said restraining portion of said casing, whereby movement of the peripheral end of said pressure ring beyond the free edge of said packing ring is restrained by said annular restraining means.

2. An oil retaining device to seal a space between relatively movable machine elements comprising an outwardly opening generally U shaped metal casing having a cylindrical portion to be fixedly held in oil tight contact on such shaft, a substantially radial backing portion carried by said cylindrical portion, and an outwardly extending annular restraining portion spaced from said backing portion; an angle shaped molded packing ring of oil resistant rubberlike material, said packing ring having a substantially radial annular portion disposed within said casing and bearing against the backing portion of said casing, and a sealing portion carried by said radial portion and in angular relation therewith, said sealing portion having a conoidal inner surface and terminating at its free end in an annular sealing lip which is adapted to bear against an inner cylindrical surface of one of the relatively movable machine elements; and a molded pressure ring of flexible soft resilient oil resistant synthetic rubber compound disposed within the re-entrant angle between said radial portion and said sealing portion of said packing ring, said pressure ring having a portion which bears against said outwardly extending annular restraining portion of said casing and an outer peripheral end portion which bears against the inner conoidal surface of said sealing portion of said packing ring only adjacent the free end thereof; the pressure ring being molded on and adhesively attached to said restraining portion of said casing, whereby movement of the free end of said pressure ring beyond the free edge of said packing ring is restrained by tension between it and said annular restraining means.

3. An oil retaining device to seal a space between a housing and a rotatable shaft comprising an outwardly opening generally U shaped metal casing having a cylindrical portion to be fixedly held in oil tight contact on such shaft, a substantially radial backing portion carried by said cylindrical portion, and an outwardly extending annular restraining portion spaced from said backing portion; an angle shaped molded packing ring of oil resistant rubberlike material, said packing ring having a substantially radial annular portion disposed within said casing and bearing against the backing portion of said casing, and a generally frusto-conical sealing portion with a frusto-conical inner surface carried by said radial portion and in angular relation therewith, said radial annular portion of said packing having a groove adjacent its juncture with said sealing portion, said sealing portion terminating at its free end in an annular sealing lip which is adapted to bear against an internal cylindrical surface of said housing; a molded pressure ring of flexible soft resilient oil resistant synthetic rubber compound disposed within the re-entrant angle between said radial portion and said sealing portion of said packing ring, said pressure ring having a portion which bears against said outwardly extending annular restraining portion of said casing and an outer peripheral end portion of a generally conoidal shape that bears against the inner surface of said sealing portion of said packing ring adjacent the free end thereof; the pressure ring being molded on and adhesively attached to said restraining portion of said casing, whereby movement of the pressure and of said pressure ring beyond the free edge of said packing ring is restrained by tension between it and said annular restraining means.

4. An oil retaining device to seal a space between a housing and a rotatable shaft comprising an outwardly opening generally U shaped metal casing having a cylindrical portion to be fixedly held in oil tight contact on such shaft, a substantially radial backing portion carried by said cylindrical portion and an outwardly extending annular restraining portion spaced from said backing portion; an angle shaped molded packing ring of oil resistant rubberlike material, said packing ring having a substantially radial annular portion disposed within said casing and bearing against the backing portion of said casing, and a sealing portion carried by said radial portion and in angular relation therewith, said sealing portion being of conoidal shape with a conoidal inner surface and terminating at its free end in an annular sealing lip which is adapted to bear against an internal cylindrical surface; a molded pressure ring of flexible soft resilient oil resistant synthetic rubber compound disposed within the re-entrant angle between said radial portion and said sealing portion of said packing ring, said pressure ring having a portion which bears against said outwardly extending annular restraining portion of said casing and a tapered outer surface which is generally complemental to said inner surface of said sealing portion and which has an outer peripheral end portion that bears against the inner surface of said sealing portion of said packing ring adjacent the free end thereof; the pressure ring being molded on and adhesively attached to said restraining portion of said casing, whereby movement of the peripheral end of said pressure ring beyond the free edge of said packing ring is restrained by tension between it and said annular restraining means.

5. An oil retaining device to seal a space between a housing and a rotatable shaft comprising an outwardly opening generally U-shaped metal casing having a cylindrical portion to be fixedly held in oil-tight contact on said shaft, a substantially radial backing portion carried by said cylindrical portion, and an outwardly extending annular restraining portion spaced from said backing portion; an angle-shaped molded packing ring of soft resilient oil-resistant rubberlike material, said packing ring having a substantially radial annular portion disposed within said casing and bearing against the backing portion of said casing, and a sealing portion carried by said radial annular portion and in angular relation and integral therewith, said sealing portion having a generally conoidal inner surface and terminating at its free end in an annular sealing lip which is adapted to bear against an inner cylindrical surface; a molded pressure ring of flexible oil-resistant synthetic rubber compound disposed within the re-entrant angle between said radial portion and said sealing portion of said packing ring, said pressure ring having a portion which bears against said outwardly extending annular restraining portion of said casing and an outer tapered surface with an outer peripheral end portion that bears against the inner surface of said sealing portion of said packing ring adjacent the free end thereof, the inner portion of said pressure ring being molded on and adhesively attached to said restraining portion of said casing, outward sidewise movement of the outer peripheral end portion of said pressure ring beyond the free edge of said packing ring being restrained only by cantilever resistance in said packing ring.

HOWARD M. DODGE.